US011654989B2

(12) United States Patent
Hall et al.

(10) Patent No.: US 11,654,989 B2
(45) Date of Patent: May 23, 2023

(54) LOAD LEVELING HANGER

(71) Applicant: Hall Labs LLC, Provo, UT (US)

(72) Inventors: David R. Hall, Provo, UT (US);
Jerome Miles, Spanish Fork, UT (US);
Casey Webb, Spanish Fork, UT (US);
Corey Webb, Spanish Fork, UT (US);
Matt Van Dyke, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/381,830

(22) Filed: Apr. 11, 2019

(65) Prior Publication Data
US 2020/0326029 A1  Oct. 15, 2020

(51) Int. Cl.
*B62H 3/12* (2006.01)
*F16M 11/04* (2006.01)
*F16M 13/02* (2006.01)

(52) U.S. Cl.
CPC ............. *B62H 3/12* (2013.01); *F16M 11/045* (2013.01); *F16M 13/027* (2013.01)

(58) Field of Classification Search
CPC .......... B62H 3/12; B62H 3/02; F16M 13/027; F16M 11/045; G09F 2007/186; F21V 21/16; B66C 13/16; B66C 13/22; B66C 1/10; B66C 15/00; B60R 9/06; B60R 9/10
USPC ..................................... 294/81.3; 211/18, 19
See application file for complete search history.

(56) References Cited

U.S. PATENT DOCUMENTS

| 3,552,793 | A | * | 1/1971 | Lehtonen | ................ | B66C 1/101 |
| | | | | | | 294/81.3 |
| 3,596,968 | A | * | 8/1971 | Holm | ........................ | B66C 1/10 |
| | | | | | | 294/81.3 |
| 3,924,751 | A | * | 12/1975 | Ballenger | ................ | B62H 3/12 |
| | | | | | | 211/17 |
| 4,163,539 | A | * | 8/1979 | Awofolu | ................ | A47B 23/06 |
| | | | | | | 248/452 |
| 4,626,012 | A | * | 12/1986 | Weldele | .................... | B66C 1/10 |
| | | | | | | 294/67.1 |
| 5,529,274 | A | * | 6/1996 | Anderson | ................ | B66D 3/18 |
| | | | | | | 248/329 |
| 6,161,702 | A | * | 12/2000 | Campbell | ................ | B62H 3/12 |
| | | | | | | 211/1.57 |
| 6,237,781 | B1 | * | 5/2001 | Dahl | ........................ | B62H 3/12 |
| | | | | | | 248/320 |

(Continued)

FOREIGN PATENT DOCUMENTS

GB         2412002 A  *  9/2005  ............... G09F 7/18
JP         02249893 A  *  10/1990

*Primary Examiner* — Muhammad Ijaz
*Assistant Examiner* — Guang H Guan

(57) ABSTRACT

A load-leveling hanging apparatus and a system for suspended lifting of objects are disclosed. The load-leveling hanging apparatus includes a carriage suspended from a line; a hanging beam adapted for attachment of multiple objects at points along the beam; a mechanism for moving the hanging beam relative to the carriage to thereby achieve a level condition; and a level indicator. The mechanism is a rotatable screw. The system includes the load-leveling hanging apparatus and a lifting device. The lifting device includes a drum for winding and unwinding a line; a motor coupled to the drum to apply a torque thereto; a guide to direct the line onto the drum; and a controller. The lifting device raises and lowers the suspended hanging apparatus.

20 Claims, 7 Drawing Sheets

(56) References Cited

U.S. PATENT DOCUMENTS

| | | | | |
|---|---|---|---|---|
| 7,150,449 | B1 * | 12/2006 | Dueck | B62H 3/12 |
| | | | | 248/329 |
| 7,249,743 | B1 * | 7/2007 | Stearns | A47F 5/0892 |
| | | | | 248/329 |
| 7,931,320 | B2 * | 4/2011 | Alway | B66C 1/10 |
| | | | | 294/67.5 |
| 8,000,835 | B2 * | 8/2011 | Friz | B66C 13/04 |
| | | | | 294/67.5 |
| 8,870,145 | B1 * | 10/2014 | Carlson | A47G 25/02 |
| | | | | 248/352 |
| 9,399,566 | B2 * | 7/2016 | Hall | B66D 1/38 |
| 9,469,171 | B2 * | 10/2016 | Morga | B60D 1/246 |
| 9,540,216 | B2 * | 1/2017 | Paßmann | B66C 6/00 |
| 9,615,679 | B2 * | 4/2017 | Margetts | F16M 11/08 |
| 9,691,304 | B2 * | 6/2017 | Votolato | G09F 7/20 |
| 9,988,118 | B1 * | 6/2018 | Hall | B62H 3/12 |
| 10,511,747 | B2 * | 12/2019 | Watts | H04N 5/2251 |
| 2004/0050807 | A1 * | 3/2004 | Cheng | B62H 3/12 |
| | | | | 211/171 |
| 2018/0014989 | A1 * | 1/2018 | Levine | A61G 5/104 |
| 2020/0326029 | A1 * | 10/2020 | Hall | F16M 11/045 |

\* cited by examiner

LOAD LEVELING HANGER

TECHNICAL FIELD

This invention relates generally to the field of equipment storage, and more specifically to overhead storage.

BACKGROUND

Residential garages are often used to store items that do not easily fit inside a house. These items are often bulky, heavy, unwieldy to manage or any combination of these attributes. These items include equipment such as bicycles, kayaks, canoes, stand-up paddleboards, skis, and $5^{th}$ wheel hitches. These items can accumulate and take up space in a garage where a car or truck would ideally be parked. Overhead storage systems are often used to alleviate the problem and move the items to locations that do not interfere with people moving in the garage and vehicles moving in and out of the garage. One of the difficulties with raising these heavy, bulky, unwieldy items overhead is how to lift them. It is generally difficult for one person to raise such items high enough and secure them at such a height.

SUMMARY

In a first aspect, the disclosure provides a load-leveling hanging apparatus. The load-leveling hanging apparatus includes a carriage suspended from a line; a hanging beam adapted for attachment of multiple objects at points along the beam; a mechanism for moving the hanging beam relative to the carriage to thereby achieve a level condition; and a level indicator. The mechanism is a rotatable screw.

In a second aspect, the disclosure provides a system for the suspended lifting of objects. The system includes a hanging apparatus and a lifting device. The hanging apparatus includes a carriage suspended from a line; a hanging beam adapted for attachment of multiple objects at points along the beam; a mechanism for moving the hanging beam relative to the carriage to thereby achieve a level condition; and a level indicator. The mechanism for moving the hanging beam relative to the carriage comprises a rotatable screw. The lifting device includes a drum for winding and unwinding a line; a motor coupled to the drum to apply a torque thereto; a guide to direct the line onto the drum; and a controller. The lifting device raises and lowers the suspended hanging apparatus.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "level indicator" is meant to refer to any instrument which indicates that an object is level. This includes manual indicators such as spirit levels. Additionally, any electronic instruments that indicate whether an object is level, such as; inclinometers, tilt sensors, pendulum-based electronic leveling devices, gyroscopes, accelerometers and any combination of these instruments.

As used herein, "mobile device" is meant to refer to handheld electronic devices such as smartphones, tablets, or other similar devices.

Figure 1:
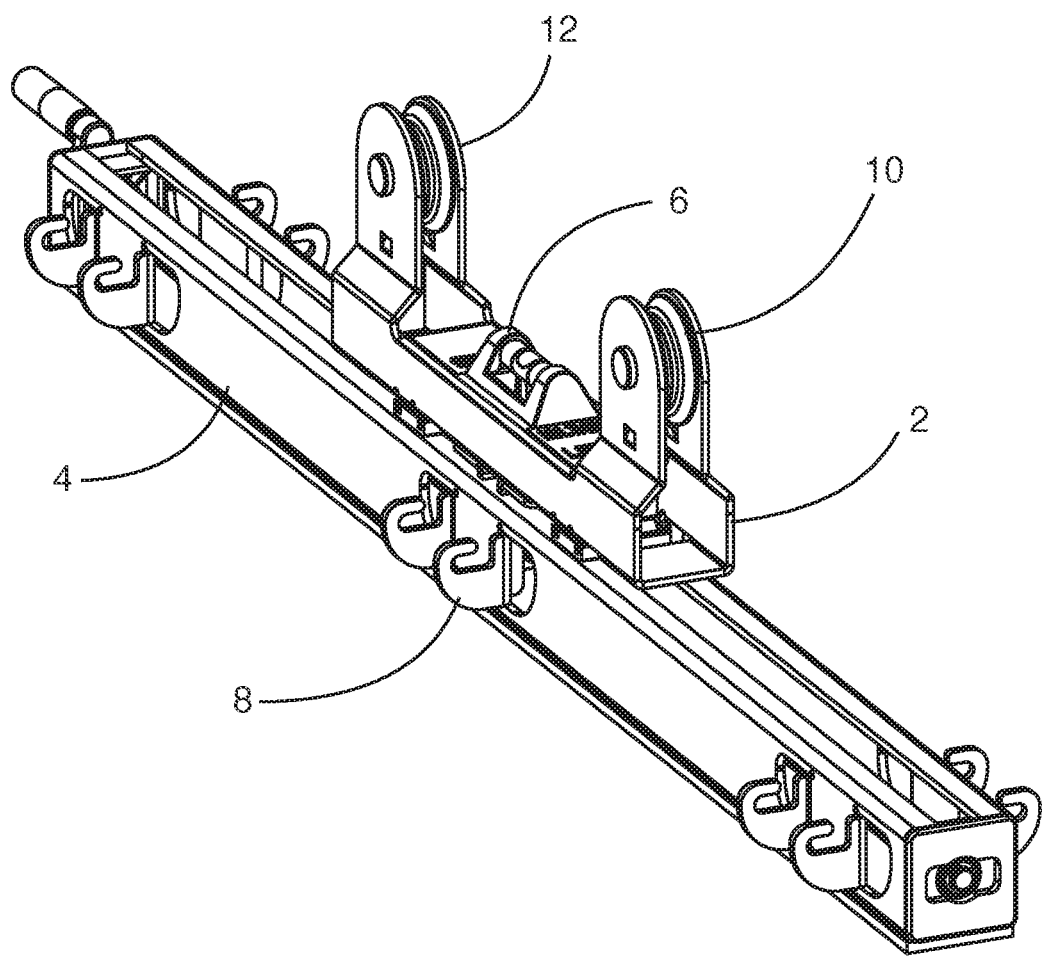
FIG. 1 is a view of a load-leveling hanger.

Now referring to FIG. 1, a view of a load-leveling hanging apparatus is shown. The load-leveling hanging apparatus has a carriage 2 that is suspended from a line. In the preferred embodiment, the carriage includes two pulleys 10 and 12. The pulleys are in contact with the line and the carriage hangs from them. In other embodiments, the carriage includes a single pulley while in still other embodiments, pulleys are not used and the line attaches to the carriage in another way, such as with an eye hook. A level indicator 6 is integrated into the carriage. In the preferred embodiment, the level indicator is a spirit level. The load-leveling hanging apparatus also has a hanging beam 4. The hanging beam is configured with attachment points for securing loads to the hanging beam. The preferred configuration for the attachment points is hooks 8 stamped from the side of the hanging beam. These attachment points can be configured in many ways. As depicted the attachment points are twelve hooks arranged in groups of two, three groups of two on each side of the hanging beam. The attachment points could also be single hooks stamped from the hanging beam. Alternatively, the attachment points could be attached to the hanging beam by rivets, screws or by welding hooks onto the hanging beam.

Figure 2:
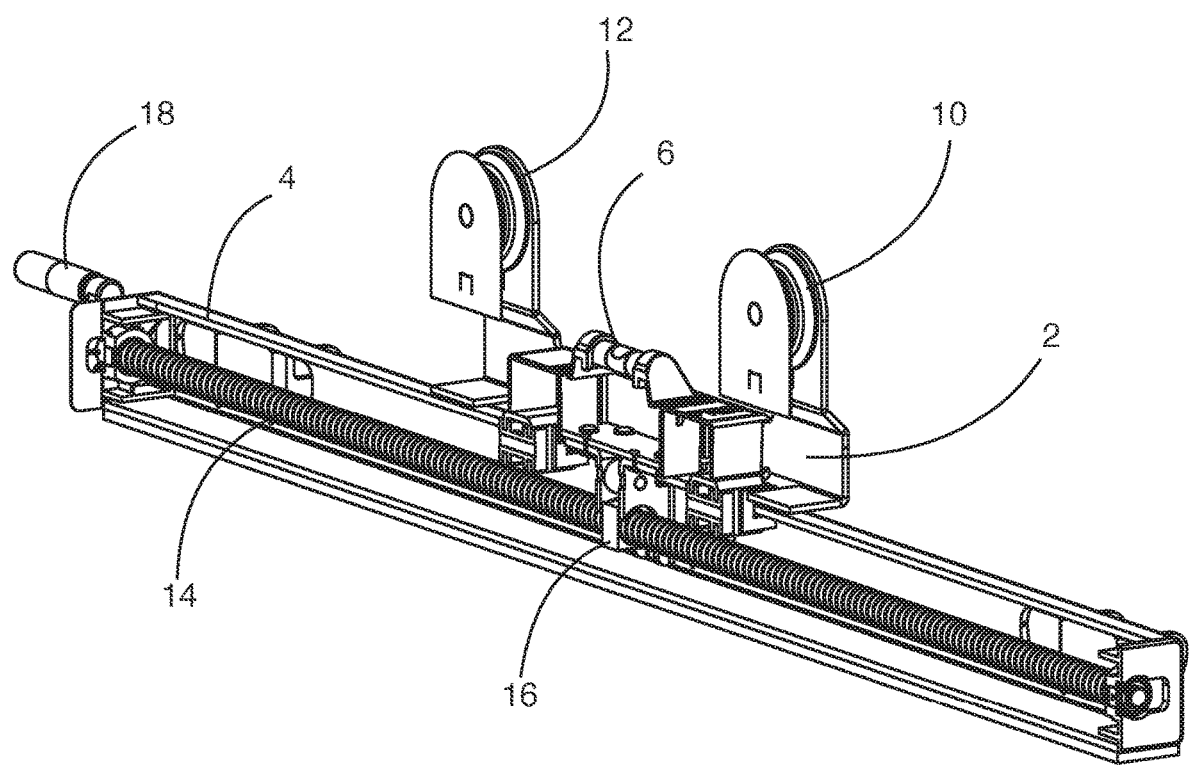
FIG. 2 is a view of the interior mechanism of a load-leveling hanger.

FIG. 2 shows a view of the mechanism for moving the carriage 2 and hanging beam 4 relative to each other. The carriage 2 includes pulleys 10 and 12, as well as a level indicator 6. Inside of the hanging beam 4, is a screw 14, that is connected to the hanging beam such that can rotate. Attached to the carriage is a nut 16. The nut 16 is threaded onto the screw 14. By rotating the screw 14, for example with crank 18, the nut 16 moves along the screw 14. By moving the nut 16 along the screw 14, the carriage 2 moves relative to the hanging beam 4. Once the carriage 2 and hanging beam 4 have been adjusted it is important that they stay in place. The pitch of the threads on the screw 14 is such that only by rotating the screw will the nut 16 move along the screw.

Figure 3:
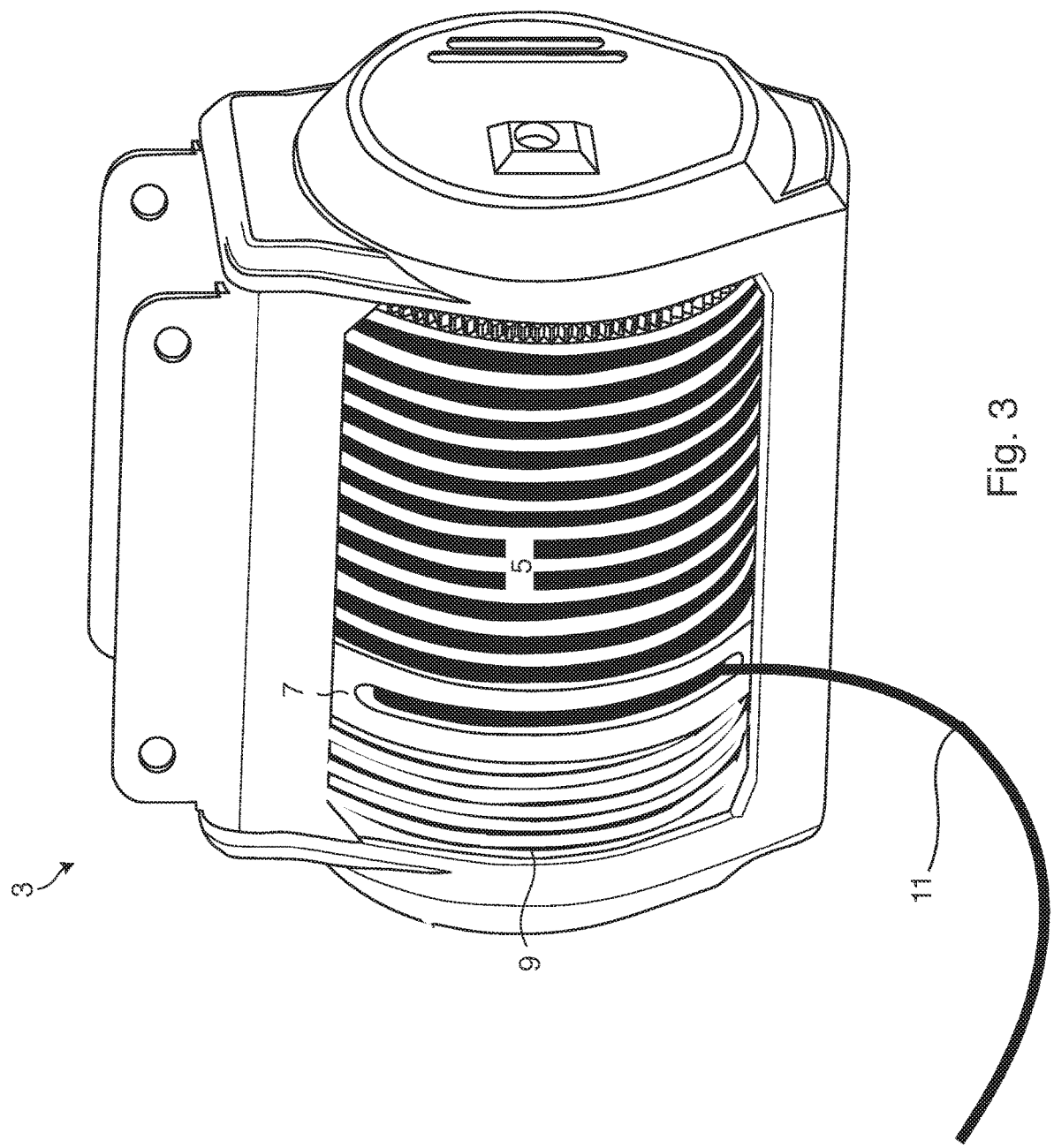
FIG. 3 is a view of a lifting device

FIG. 3 shows a lifting device. The preferred lifting device is one of the lifting devices described in U.S. Pat. Nos. 9,399,566, 9,567,194, 9,873,600, 9,908,754, 9,988,250, 9,975,745, 9,988,251 the entire contents of which are incorporated herein by reference. A simplified description of one such lifting device follows. The lifting device 3 has a grooved drum 9 on which a line 11 is wound. The lifting device also includes a guide 7 for winding the line on the drum. The drum 5 of the lifting device spools and unspools the line 11. The motor and transmission are located within the drum. The lifting device is also equipped with a controller. Preferably, the controller is assembled on a printed circuit board (PCB) and includes a wireless transmitter, a processor and memory. The wireless transmitter of the controller connects the lifting device to a mobile device. The mobile device is configured to run an app for controlling the lifting device. Through the app the controller causes the motor to turn the drum. As the drum turns in one direction, the line unspools from the drum of the lifting device. As the drum spools in the other direction, the line spools onto the drum of the lifting device.

FIGS. 4, 5, 6, and 7 show the preferred embodiment for the load-leveling hanger. In this configuration, the bikes are attached to the hanging beam by straps. The straps attach to the hooks stamped into the side of the hanging beam. The load-leveling hanger is suspended from a line 36. One end of the line 36 is attached to a lifting device 30. The lifting device is attached to an overhead mounting system 32 such as that described in U.S. Pat. No. 9,939,105, the entire contents of which are incorporated by reference. The other end of the line 36 is preferably attached to a carabiner 34, which is in turn attached to the overhead mounting system 32. Two pulleys on the carriage 38 of the load-leveling hanger, ride on the line 36. The carriage 38 and the hanging beam 40 of the load-leveling hanger move relative to each other to level the hanger when objects of varying weights are attached to the hanging beam. By turning the crank 42 a screw is turned which moves the carriage 38 relative to the hanging beam 40. By moving the carriage 38 relative to the hanging beam 40 the point of balance is able to move along the hanging beam 40. Moving the point of balance along the hanging beam 40 enables the hanging beam 40 to hang in a level condition. One advantage of the level hanging beam is to ensure that the items attached to the load-leveling hanger are raised to a level high enough for people to move around underneath and for vehicles to move in and out underneath the raised items. In this preferred embodiment, a spirit level 44 indicates when the load-leveling hanger is in a level condition.

Figure 4:
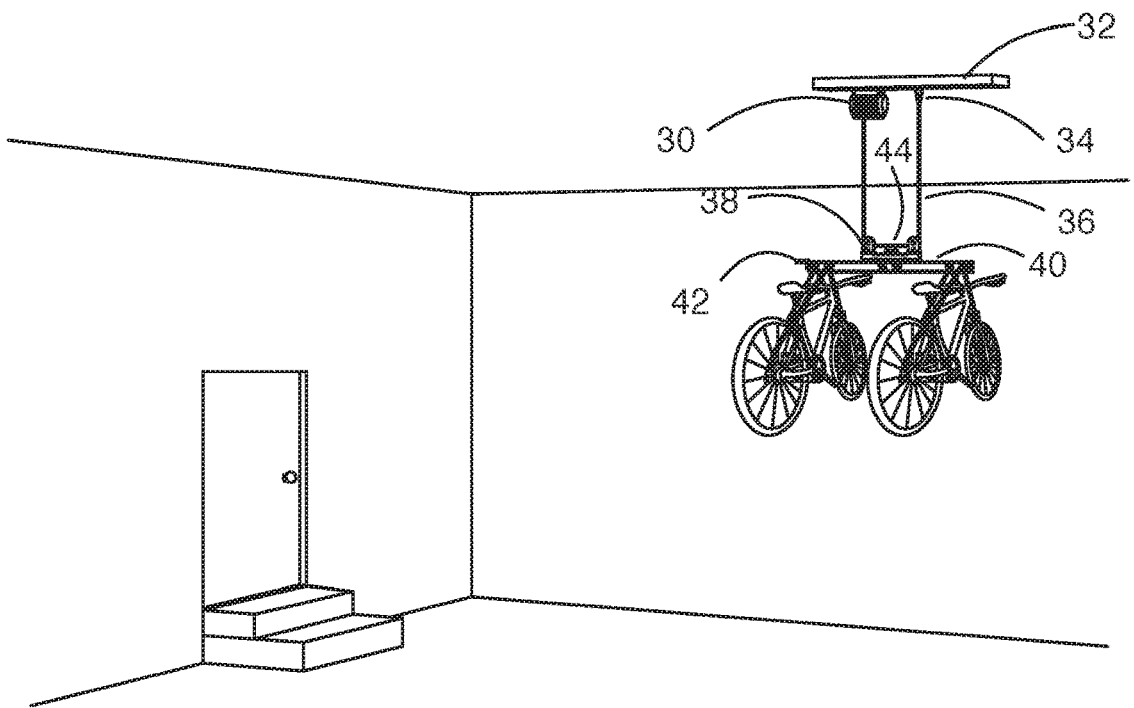
FIG. 4 is a view of a system for the suspended lifting of objects with two bikes attached.

In FIG. 4, two bikes are attached to the hanging beam 40. The carriage 38 and hanging beam have been adjusted so that the load-leveling hanger is in a level condition.

Figure 5:
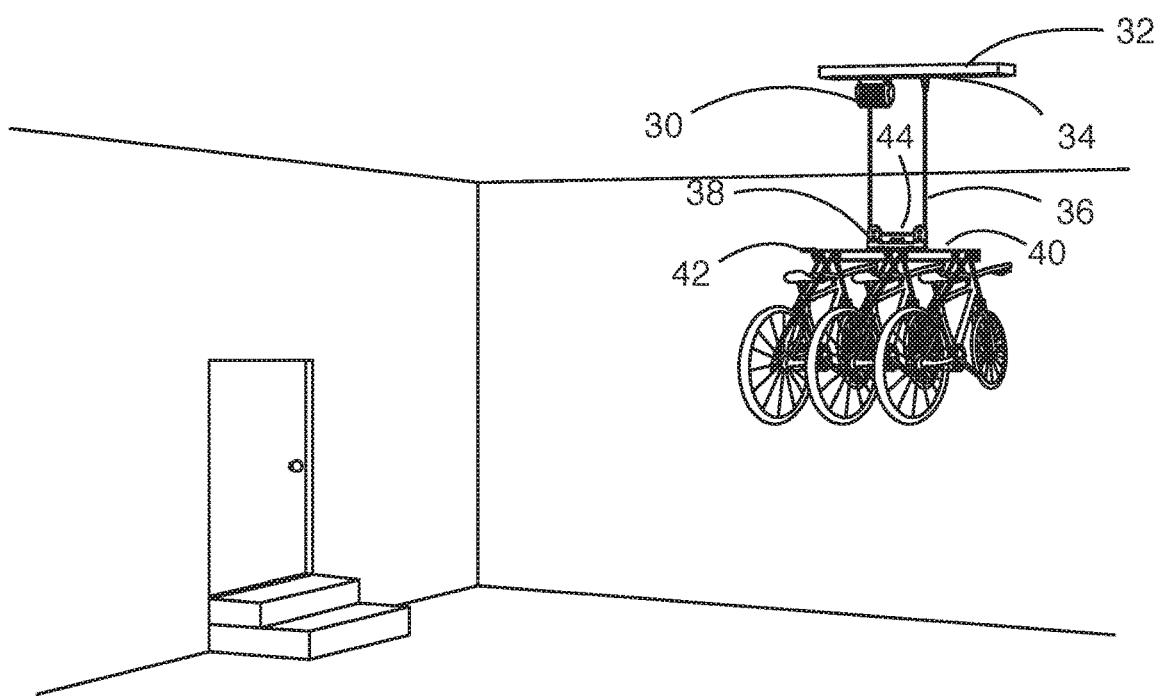
FIG. 5 is a view of a system for the suspended lifting of objects with three bikes attached.

In FIG. 5, a third bike has been added between the two previously attached bikes. The third bike was added in between the two previously attached bike and little to no adjustment was needed between the carriage 38 and the hanging beam 40.

Figure 6:
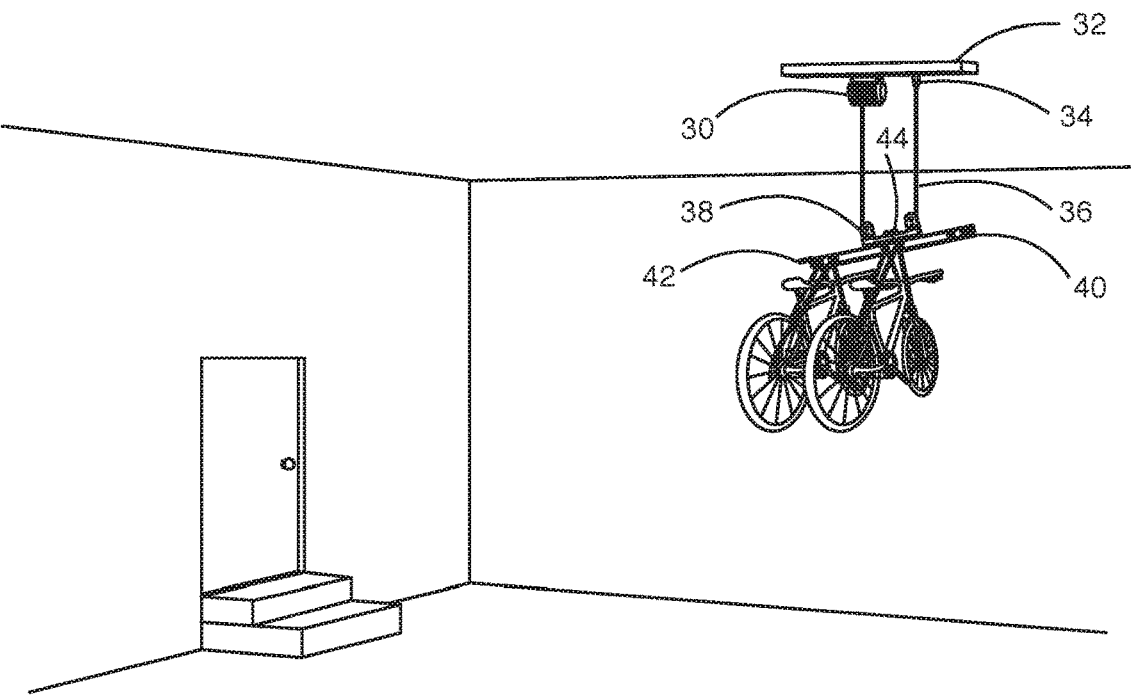
FIG. 6 is a view of a system for the the suspended lifting of objects with two bikes attached before the mechanism has adjusted the load-leveling hanger, therefore, the load-leveling hanger is tilted

In FIG. 6, a bike was removed from one end of the hanging beam 40. The weight of the other two bikes along with where the carriage 38 is positioned caused the hanging beam 40 to tilt. With the hanging beam 40 tilted the bikes hang lower. When the bikes are hanging lower it reduces the available space to move vehicles in and out and makes walking around more difficult. In general, the preferred use of the load-leveling hanger will be to keep the load-leveling hanger in a level condition. However, there may be instances in certain garages where it would be advantageous to lift one bike higher than others. This is possible with the load-leveling hanger. By tilting the load-leveling hanger one side of the hanging beam 40 can be raised higher, thus raising the possible height underneath one of the bikes. The disadvantage of tilting the load-leveling hanger and having one side raised is that the other side will be lower. In many situations, the lower side will then be low enough to interfere with moving a vehicle in and out of a garage. The load-leveling hanger does increase the options for arranging a space such as a garage, by enabling different configurations for storing bikes or other loads.

By turning the crank 42, the carriage 38 moves relative to the hanging beam 40. Moving the carriage 38 and hanging beam 40 relative to each other causes the point of balance for the load-leveling hanger to move. As the carriage 38 moves relative to the hanging beam 40, the spirit level 44 indicates when the load-leveling hanger is in a level condition. When the load-leveling hanger is in a level condition the hanging beam is in a level condition, this ensures that all of the bikes will be raised to the highest point possible.

Figure 7:
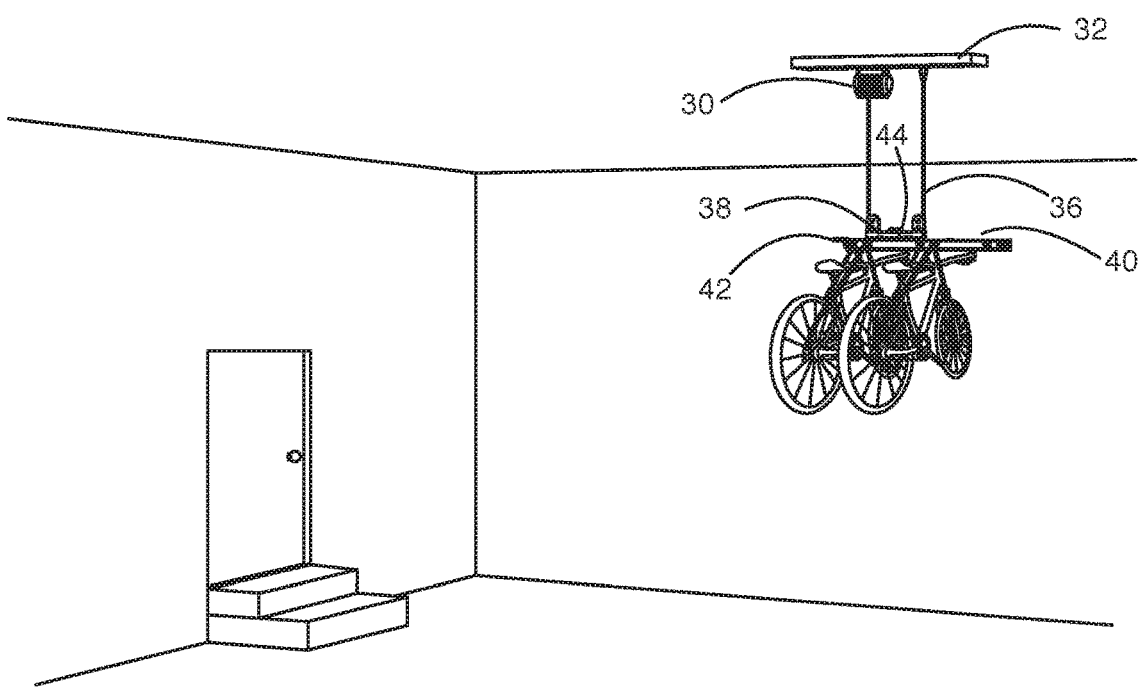
FIG. 7 is a view of a system for the suspended lifting of objects with two bikes attached after the mechanism has adjusted the load-leveling hanger, therefore, the load-leveling hanger is level.

FIG. 7 shows the carriage 38 has moved relative to the hanging beam 40, and that the load-leveling hanger is in a level condition.

Figure 8:
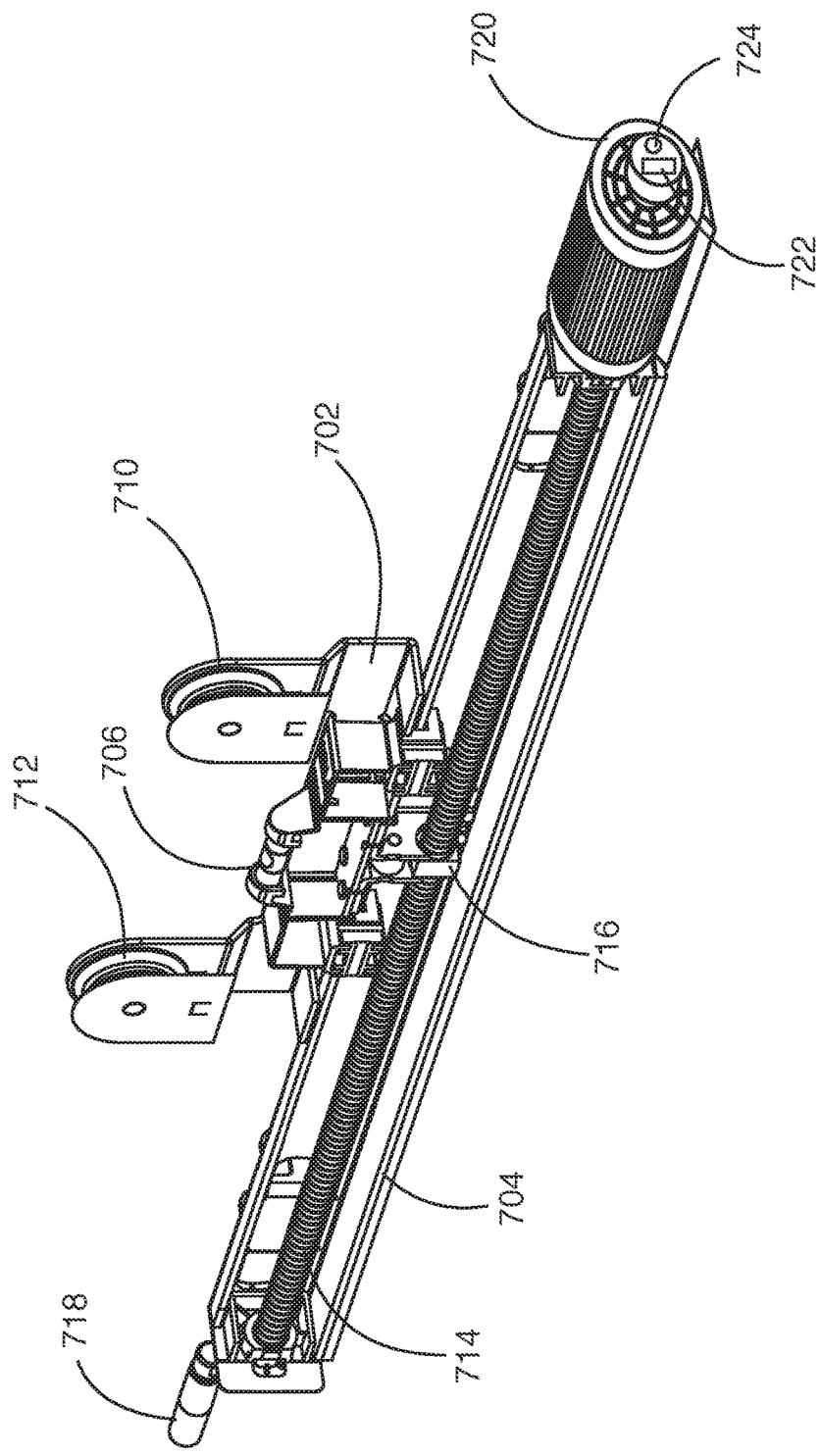
FIG. 8 is a view of the interior mechanism of a load-leveling hanger, with the addition of a motor for leveling the load.

FIG. 8 is an alternative embodiment of the hanger which has incorporated a motor into the mechanism for moving the carriage 702 and hanging beam 704 relative to each other. The carriage 702 includes pulleys 710 and 712, as well as a level indicator 706. Inside of the hanging beam 704, is a screw 714, that is connected to the hanging beam such that it can rotate. Attached to the carriage is a nut 716. The nut 716 is threaded onto the screw 714. By rotating the screw 714, for example with crank 718, the nut 716 moves along the screw 14. By moving the nut 716 along the screw 714, the carriage 702 moves relative to the hanging beam 704.

Incorporating a motor 720 into the load-leveling hanger enables automated operation of the hanger. The motor 720 includes a controller 722 which controls the motor 720 and the turning of the screw 714. The controller 722 is assembled on a printed circuit board (PCB) and includes a wireless transmitter, a processor, and memory. The controller 722 is preferably connected to an accelerometer 724. The accelerometer 724 determines when the hanger is level. Parameters for operation of the hanger are stored in the memory of the controller. The controller 722 causes the motor 720 to turn the screw 714 until the accelerometer 724 indicates that the hanger is level. When the accelerometer 724 indicates that the hanger is level the controller causes the motor to stop turning the screw.

It is possible that the motor 720, could under certain circumstances run out of power or be disconnected from its power source. The load-leveling hanger includes a crank 718 to allow leveling of the load even when the motor is unable to run.

In the aforementioned embodiment, the motor is attached at one end of the hanging beam. In an alternative embodiment, the motor is attached to the carriage. In this alternative embodiment with the motor attached to the carriage, the motor will turn a worm gear, which is essentially a screw. The worm gear will interface with a fixed screw attached to the hanging beam. Alternatively, the worm gear could interface with a rack, such as a helical rack attached to the hanging beam. The foregoing are merely examples and do not encompass every possible embodiment of a load-leveling hanger.

Figure 9:
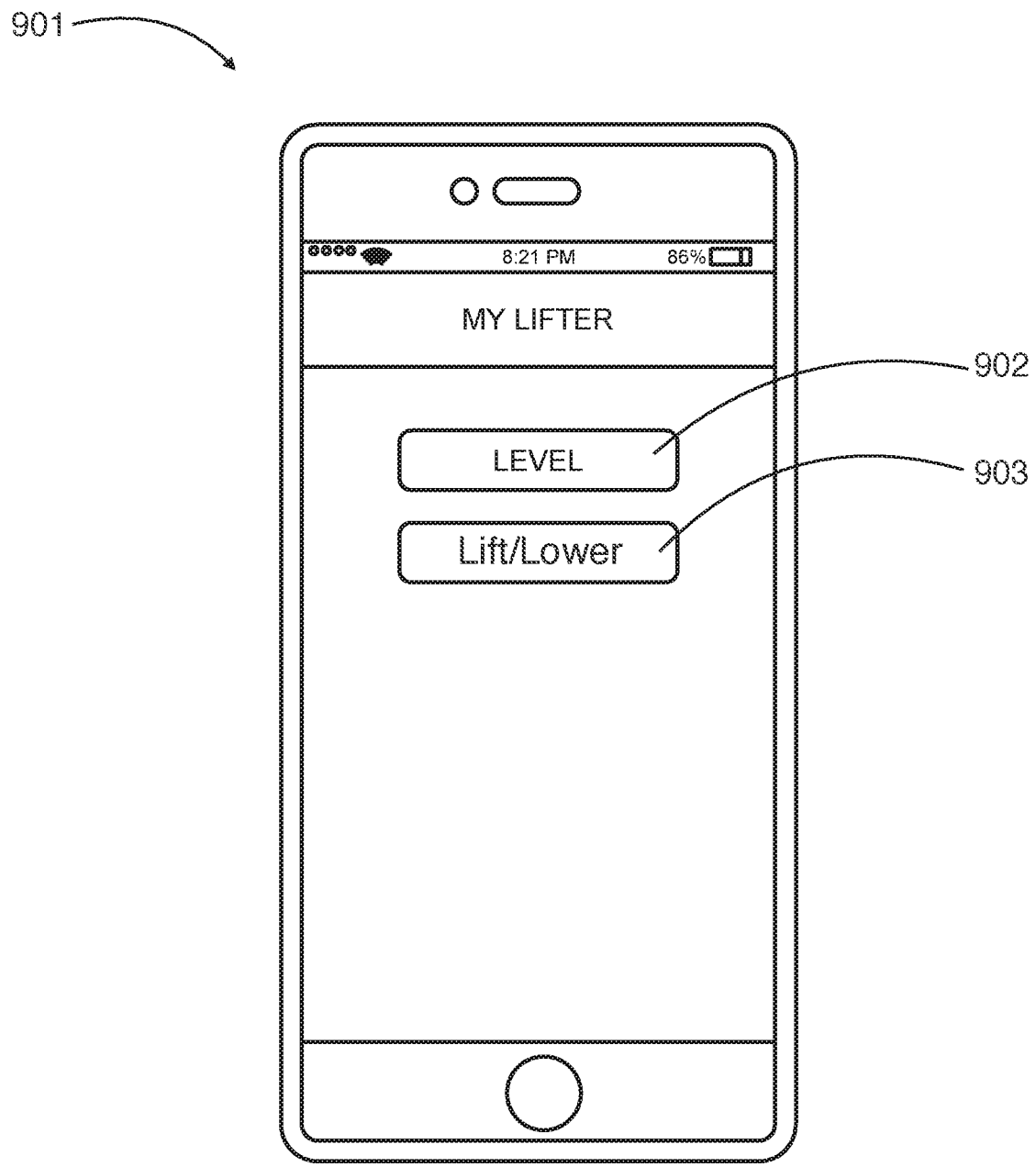
FIG. 9 is a view of a graphical interface of an app for controlling the load-leveling hanger.

The wireless transmitter included in the controller is configured to communicate with a mobile device, for example, a smartphone. The mobile device will be configured with controls for the hanger. The controls are accessed via an app that can be downloaded to the mobile device. FIG. 9 shows a representation of some of the control functions available. A mobile device 901 in the preferred embodiment a smartphone running an app for controlling the hanger and the lifting device. The app includes a graphical user interface with graphical buttons for controlling the function of the hanger. For example, when loads are attached to the hanger the level button 902 is pressed. The mobile device will communicate with the controller in the hanger via the wireless transmitter. Pressing the level button 902 will cause the controller to direct the motor to turn the screw until the carriage has moved relative to the hanging beam, to a position that the accelerometer senses is level. When the accelerometer indicates that the hanger is in a level condition, the controller will direct the motor to stop turning the screw. The graphical lift button 904 will cause the lifter to lift the load-leveling hanger when pressed.

In certain embodiments, the controller operates to prevent the lifter from lifting the the load-leveling hanger above a predetermined height until the load-leveling hanger is in a level condition. In other words, it may lift the hanger a foot or two and then determine if the hanger is level or not. If it is level, or after changes have been made to make it level, the lifter can lift the hanger all the way to the storage position. For example, the lifter may lift the hanger 2 feet off the ground, whereupon the controller receives a signal as to whether the hanger is in the level condition or not. If it is, the lifter lifts the hanger the rest of the way to the storage position. If it is not, the device may beep or give some other alert to the user that it needs to be leveled. One way of accomplishing this is, the graphical button on the mobile device will not respond until the load-leveling hanger is in a level condition. Alternatively, the lifter will be programmed not to lift until the load-leveling hanger is in a level condition.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A load-leveling bicycle hanging and lifting system comprising:
    an overhead mounting system for mounting inside a structure;
    a line having a first end and a second end, wherein the line is attached at the first end to the overhead mounting system;
    a lifting device attached to the overhead mounting system and comprising:
        a drum for winding and unwinding the line, wherein the line is attached at the second end to the drum;
        a motor coupled to the drum to apply a torque thereto;
        a guide to direct the line onto the drum; and
        a controller;
    a carriage with a first pulley and a second pulley, wherein the line passes downward from the drum, around the first pulley, around the second pulley and upward to the overhead mounting system;
    a hanging beam suspended from the carriage and configured for attaching at least two bicycles positioned substantially perpendicular thereto;
    a threaded mechanism mounted between the carriage and the hanging beam, wherein the threaded mechanism comprises a screw and a nut;
    wherein, when the at least two bicycles are attached to the hanging beam in an arrangement that causes the hanging beam to tilt, relative rotation between the screw and the nut is adapted to cause movement of the hanging beam relative to the carriage to thereby achieve a level condition of the hanging beam, thereby enabling the hanging beam to lift and store the at least two bicycles in the level condition;
    wherein the first end of the line and the lifting device are adapted to removably attach at multiple points along the overhead mounting system.

2. The load-leveling bicycle hanging and lifting system of claim 1, further comprising a level indicator.

3. The load-leveling bicycle hanging and lifting system of claim 2, wherein the screw traverses substantially an entire length of the hanging beam.

4. The load-leveling bicycle hanging and lifting system of claim 1, further comprising a first plurality of hooks on a front side of the hanging beam and a second plurality of hooks on a back side of the hanging beam.

5. The load-leveling bicycle hanging and lifting system of claim 4, further comprising straps.

6. The load-leveling bicycle hanging and lifting system of claim 5, wherein the load-leveling bicycle hanging and lifting system is adapted to enable the straps to attach the at least two bicycles to the hanging beam.

7. The load-leveling bicycle hanging and lifting system of claim 6, wherein the hanging beam is adapted to store the at least two bicycles in the level condition by moving relative to the carriage to account for any placement of the at least two bicycles on the hanging beam that causes the hanging beam to tilt.

8. The load-leveling bicycle hanging and lifting system of claim 7, wherein the hanging beam is adapted to store the at least two bicycles in a tilted condition.

9. The load-leveling bicycle hanging and lifting system of claim 1, further comprising a hand crank attached to the threaded mechanism.

10. The load-leveling bicycle hanging and lifting system of claim 1, wherein the controller is configured to communicate with and receive commands from a smart phone.

11. The load-leveling bicycle hanging and lifting system of claim 1, wherein the hanging beam is configured to hold and lift three bicycles.

12. A load-leveling bicycle hanging and lifting system comprising:
   an overhead mounting system for mounting inside a structure;
   a line having a first end and a second end, wherein the line is attached at the first end to the overhead mounting system;
   a lifting device attached to the overhead mounting system and comprising:
      a drum for winding and unwinding the line, wherein the line is attached at the second end to the drum;
      a motor coupled to the drum to apply a torque thereto;
      a guide to direct the line onto the drum; and
      a controller;
   a carriage with a first pulley and a second pulley, wherein the line passes downward from the drum, around the first pulley, around the second pulley and upward to the overhead mounting system;
   a hanging beam suspended from the carriage and configured for attaching at least two bicycles positioned substantially perpendicular thereto;
   a threaded mechanism mounted between the carriage and the hanging beam, wherein the threaded mechanism comprises a screw and a nut;
   wherein, when the at least two bicycles are attached to the hanging beam in an arrangement that causes the hanging beam to tilt, relative rotation between the screw and the nut is adapted to cause movement of the hanging beam relative to the carriage to thereby achieve a level condition of the hanging beam;
   wherein the first end of the line and the lifting device are adapted to removably attach to the overhead mounting system and the overhead mounting system is adapted to enable the first end of the line and the lifting device to be positioned at multiple points along the overhead mounting system.

13. The load-leveling bicycle hanging and lifting system of claim 12, further comprising a level indicator.

14. The load-leveling bicycle hanging and lifting system of claim 13, wherein the level indicator is an accelerometer.

15. The load-leveling bicycle hanging and lifting system of claim 12, further comprising a first plurality of hooks on a front side of the hanging beam and a second plurality of hooks on a back side of the hanging beam.

16. The load-leveling bicycle hanging and lifting system of claim 15, wherein each hook is stamped and bent from the front side of the hanging beam or the back side of the hanging beam;
   wherein a portion of each hook remains connected to the front side of the hanging beam or the back side of the hanging beam, and each hook is bent to a substantially perpendicular position relative to the front side of the hanging beam or the back side of the hanging beam.

17. A load-leveling hanging and lifting system comprising:
   an overhead mounting system for mounting inside a structure;
   a line having a first end and a second end, wherein the line is attached at the first end to the overhead mounting system;
   a lifting device attached to the overhead mounting system and comprising:
      a drum for winding and unwinding the line, wherein the line is attached at the second end to the drum;
      a motor coupled to the drum to apply a torque thereto;
      a guide to direct the line onto the drum; and
      a controller;
   a carriage with a first pulley and a second pulley, wherein the line passes around the first pulley and around the second pulley;
   a hanging beam suspended from the carriage and configured for attaching multiple objects thereto;
   a threaded mechanism mounted between the carriage and the hanging beam, wherein the threaded mechanism comprises a screw and a nut;
   a leveling motor attached to the threaded mechanism;
   a leveling controller;
   a level indicator;
   wherein relative rotation between the screw and the nut is adapted to cause movement of the hanging beam relative to the carriage to thereby achieve a level condition of the hanging beam;
   wherein the level indicator is an accelerometer;
   wherein the lifting device will not raise the hanging beam until the accelerometer determines that the hanging beam is in the level condition.

18. The load-leveling hanging and lifting system of claim 17, wherein both the controller of the lifting device and the leveling controller are adapted to communicate with and receive commands from a smart phone.

19. The load-leveling hanging and lifting system of claim 17, wherein the leveling motor starts upon a command received from a smart phone and stops when the accelerometer indicates that the hanging beam is in the level condition.

20. The load-leveling hanging and lifting system of claim 17, further comprising a hand crank for turning the screw to achieve the level condition of the hanging beam in the event that the leveling motor loses power.

* * * * *